INVENTOR.
T. S. WHITSEL, JR.

July 22, 1958 T. S. WHITSEL, JR 2,843,942
PROCESS FOR DRYING WET CARBON BLACK PELLETS
Filed Dec. 7, 1953 2 Sheets-Sheet 2

INVENTOR.
T. S. WHITSEL, JR.
BY
Hudson & Young
ATTORNEYS

2,843,942

PROCESS FOR DRYING WET CARBON BLACK PELLETS

Travis S. Whitsel, Jr., Borger, Tex., assignor to Phillips Petroleum Company, a corporation of Delaware Application December 7, 1953, Serial No. 396,503

7 Claims. (Cl. 34—10)

This invention relates to the drying of pelleted solids. In one aspect, it relates to a process for drying carbon black pellets produced by a wet pelleting process. In another aspect, it relates to a novel combination of process steps wherein wet carbon black pellets are dried, and water and carbon black dust obtained in said process are recovered and recycled to a wet pelleting operation.

It is known in the art to pellet carbon black. Pelleted carbon black has the advantages, as compared to unpelleted or loose carbon black, of being capable of being stored, transported, or otherwise handled without the formation of large amounts of dust, which would result in loss and inconvenience.

Two general types of pelleting processes are generally recognized in the art. One of these is known as a dry pelleting process, wherein a mass of relatively dry, unpelleted carbon black is rolled in a low-velocity, rotating drum at a moderately elevated temperature; and pellets of the carbon black form as a result of compression of the loose carbon black by the overlying mass of carbon black. A second method is known as the wet pelleting method and comprises the formation of a slurry or paste of loose carbon black with a predetermined amount of water, and the forming of this paste into the pellets, by extrusion through a die or agitation with a special type of agitator, followed by drying of the wet pellets. It is with a wet pelleting method that the present invention is chiefly concerned.

Generally stated, the present invention comprises maintaining a dense fluidized bed of wet pelleted solid material; passing a drying gas upwardly through said bed at a fluidizing velocity, i. e., at such a velocity that hindered settling occurs; and withdrawing dried pellets from an upper portion of said bed. Dried pellets are preferably removed from the fluidized bed at a locus remote from the locus of introduction of wet pellets. It has been found that in a fluidized bed of pellets maintained under hindered settling conditions, wet pellets, by virtue of their greater density, gravitate toward a lower portion of the fluidized bed, while dried pellets, on account of their lesser density, move toward the upper portion of said bed and can be selectively withdrawn therefrom. The present invention is distinguished from processes in which the dry pelleting of carbon black is effected by the fluidization of a mass of loose or unpelleted carbon black, since in such a process a separation of dried from wet pellets is not substantially effected, the overlying or upper part of the fluidized bed consisting almost entirely of loose or unpelleted black. In the present process, on the other hand, the fluidized bed is made up substantially completely of pellets which have been preformed; only small amounts of loose black, formed by attrition, are present, and such amounts are removed from the fluidized bed by the fluidizing gas.

According to one modification of this invention, the water which is removed during the drying process is condensed and recycled to the wet pelleting operation. This water, which has been evaporated from the carbon black pellets, has substantially the character of distilled water. It is substantially free of mineral matter and, therefore, is of a purity highly desirable in a wet pelleting process, since it introduces substantially no ash-forming material into the carbon black pellets.

According to another modification of the present invention, loose carbon black or carbon black dust, which is formed in small amounts as a result of attrition of the carbon black pellets during the drying operation, is recovered together with the water condensed from the used drying gas and is recycled with the recovered water to the wet pelleting operation, thus substantially reducing attrition losses.

According to a further modification of the invention, the depth of the fluidized bed of carbon black pellets is controlled by controlling the height or level at which dried pellets are withdrawn from the fluidized bed. Since some attrition occurs during the drying, it is desirable not to extend, unduly, the residence time of a pellet in the drying zone. The most desirable time will depend upon several factors, such as the initial water content of the wet pellets, the temperature differential between the incoming and outgoing drying gas, the moisture content of the drying gas, and the desired degree of drying. Thus, according to this invention, the optimum residence time of a pellet within the drying zone is readily obtained.

Figure 1:
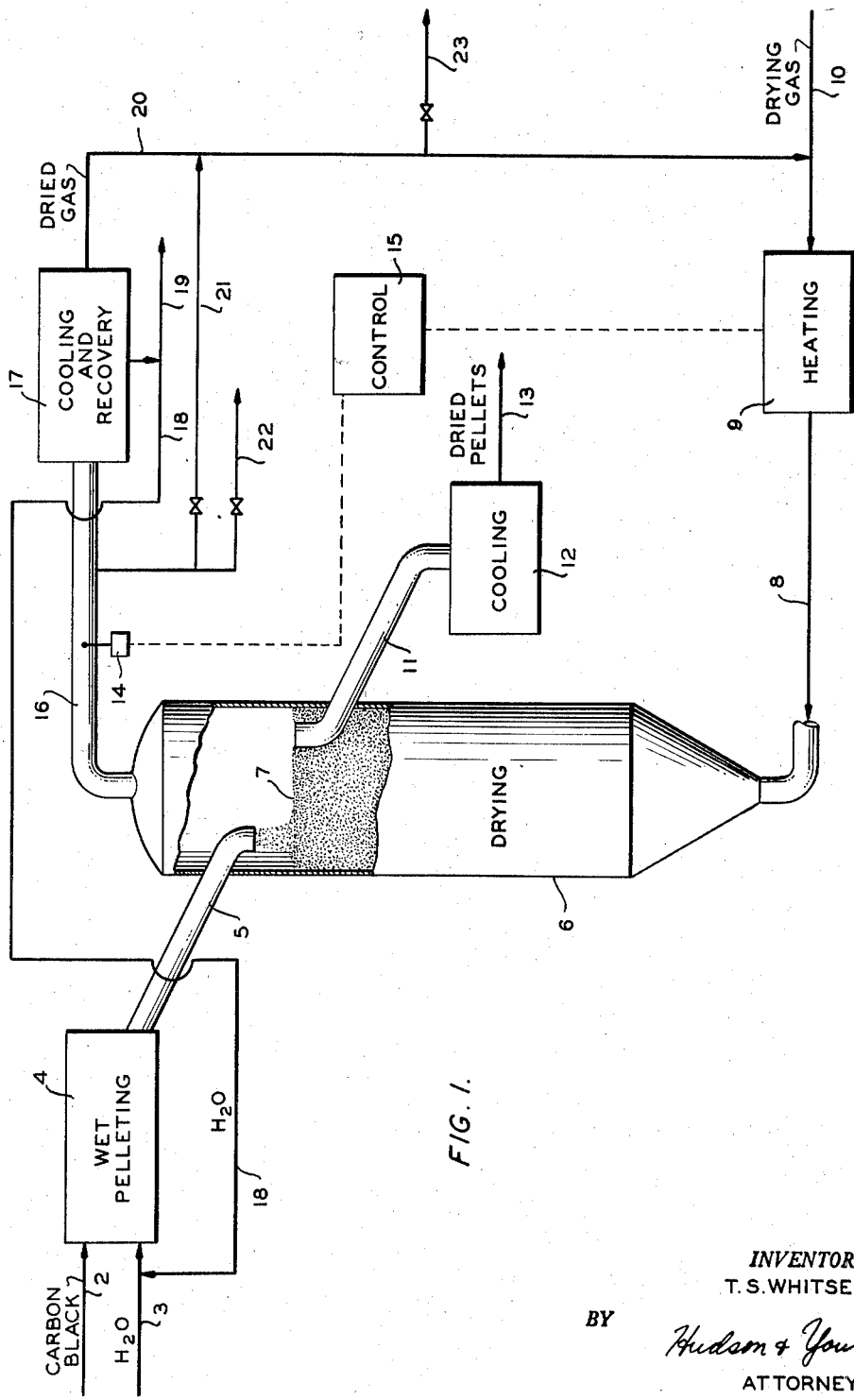
Figure 1 is a diagrammatic flow sheet illustrating one embodiment of this invention.

As illustrated in Figure 1, loose, unpelleted carbon black enters wet pelleting zone 4 through inlet 2. A predetermined amount of water enters zone 4 through inlet 3. Wet pelleting zone 4 represents any wet pelleting process known in the art, and the relative proportions of loose carbon black and water introduced into zone 4 are known in the wet pelleting art.

Pellets formed in zone 4 pass, for example, by gravity, through conduit 5 into drying zone 6, which is ordinarily a vertically elongated, generally cylindrical container of desired capacity. The drying gas enters heating zone 9 through inlet 10. Heating zone 9 can be of any suitable design known in the art for the heating of a gas. The drying gas is ordinarily heated to a temperature above the boiling point of water under the pressure of drying zone 6. Preferably, this temperature is in the range 500 to 1000° F.; however, temperatures below this range can be used.

Suitable drying gases are hydrogen, carbon monoxide, carbon dioxide, nitrogen, methane, ethane, natural gas, residue gas, combustion or flue gas, and air. Of these gases, carbon dioxide and/or nitrogen are often preferred because of their non-toxicity and general chemical inertness. When air is used as the drying gas, a relatively low temperature within the ranges previously set forth is used in order to avoid ignition and combustion of the carbon black.

The heated drying gas passes upwardly through drying zone 6 at a velocity such that a dense, fluidized bed of carbon black pellets is maintained in drying zone 6. The general technique of fluidization is well known in the art. The velocity of the drying gas is such that the bed of carbon black pellets is maintained in a turbulent, dense phase which, in appearance, resembles a boiling liquid. Thus, substantially all of the carbon black remains within drying zone 6 and does not pass from said zone with the out-flowing gas. Conditions of the type described are generally known as hindered settling conditions. Under such conditions, a separation of solid particles subjected to the hindered settling conditions is obtained, based on differences in density of the solids subjected to such conditions. It has been found that the wet carbon black pellets, being of greater density than dried pellets, tend to settle toward the bottom of the fluidized bed, while dried pellets are displaced upwardly toward the top of the bed. The dried pellets are withdrawn from the upper part of the bed through outlet 11, which can be in the form of a gravity stand-pipe which extends into the fluidized bed in drying zone 6 and to the top, or almost to the top, of the upper level of the fluidized bed, designated as 7 in the drawing. The carbon black pellets are withdrawn from the fluidized bed at a point laterally remote from that at which wet pellets are introduced and at a temperature preferably above the boiling point of water under the conditions of contacting. A preferred temperature of the withdrawn pellets is from about 250 to about 350° F. and, more desirably, about 300° F. The pressure within the drying zone 6 is ordinarily about atmospheric or slightly super-atmospheric, e. g., 14 to 100 p. s. i. g. Vacuum operation is feasible, however. The withdrawn pellets are cooled by any suitable means in cooling zone 12, and dried pellets of carbon black are withdrawn as product through outlet 13.

The wet pellets supplied to drying zone 6 through inlet 5 ordinarily contain from about 50 to about 57 weight percent water. Part of the sensible heat of the drying gas introduced through line 8 heats the pellets to a temperature at which the water diffuses to the surface of the pellets and vaporizes.

The used drying gas withdrawn from drying zone 6 through conduit 16 contains appreciable amounts of water and small amounts of carbon black dust produced by attrition of the pellets during the fluidization in zone 6. Over a long period of time, the loss due to attrition and dust formation could be substantial. Therefore, according to one embodiment of this invention, the carbon black dust is recovered from the effluent drying gas. Furthermore, the water which has been removed by vaporization from the wet pellets in zone 6 is, for purposes of this invention, distilled water and is of purity suitable for reuse in the pelleting operation. Therefore, the gas which is withdrawn through conduit 16 is subjected to cooling so that the water therein is condensed and recovered. Substantial proportions of carbon black dust are also recovered, together with the condensed water, and the dust recovery can be increased, if desired, by subjecting the gas to cooling and passing it through a conventional gas-solids separation means, such as a mist precipitator or a cyclone separator. The recovered water is preferably recycled to the wet pelleting operation, together with the carbon black recovered along with the water, through conduit 18. However, the recovered material can be withdrawn from the system through outlet 19, if desired.

Drying gas, freed of water and carbon black dust, is preferably recycled to heating zone 9 through conduit 20 but can be withdrawn from the system, totally or in part, through outlet 23.

Alternatively, part of the gas withdrawn through conduit 16 can be directly recycled through conduits 21 and 20 to heating zone 9, thus retaining part of the sensible heat remaining in the effluent drying gas. Also, alternatively, the effluent drying gas can be exhausted to the atmosphere, totally or in part, through outlet 22.

It has been found desirable, on account of the high rate of heat transfer within the fluidized bed, to control automatically the temperature of the ingoing drying gas in accordance with the temperature of the effluent gas. Thus, the temperature of the effluent gas in conduit 16 can be measured by suitable temperature measuring means 14, and the temperature thereof can be converted to any suitable form of energy to actuate control means 15, which, in turn, controls the heat supply within zone 9.

Control means 15 can be any desired suitable combination of servo mechanisms, amplifiers, motor valves (e. g., controlling fuel gas supply) and similar devices known in the art.

Figure 2:
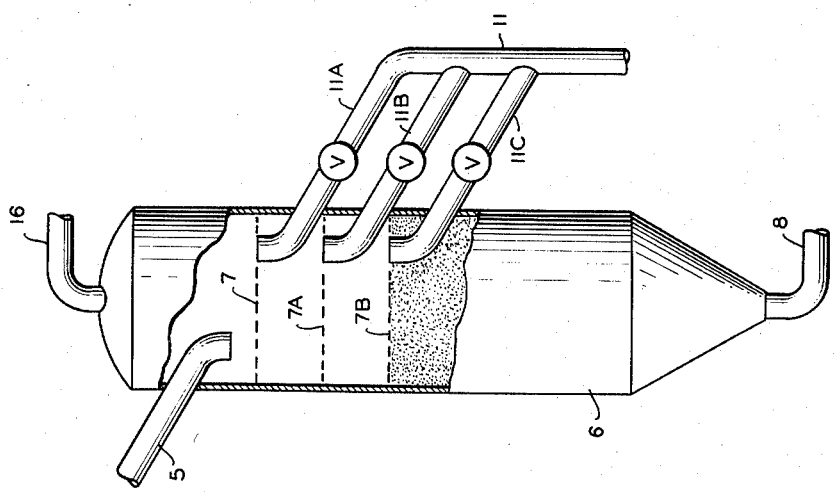
Figure 2 illustrates diagrammatically another embodiment of this invention.

According to Figure 2, the depth or level of the fluidized bed, and consequently the residence time of pellets in zone 6, can be varied in accordance with particular requirements by the use of outlet conduit 11 in the form of a manifold having branch pipes 11A, 11B, and 11C, each of which is provided with a suitable valve means. Thus, by opening only conduit 11A, a bed level corresponding to 7 is obtained; whereas by opening conduit 11B, a bed level corresponding to 7A and a corresponding shorter residence time are obtained. Likewise, by opening conduit 11C, a bed level corresponding to 7B and a still shorter residence time are obtained. Any suitable number of branched conduits can be used, as needed.

Figure 3:
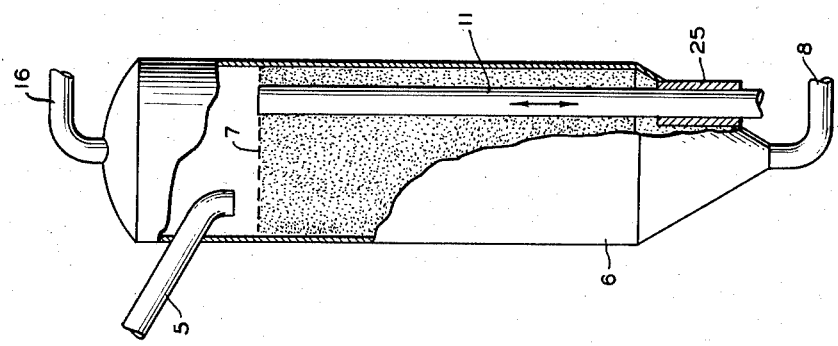
Figure 3 illustrates diagrammatically still another embodiment of the invention.

As shown in Figure 3, the bed level 7 can be adjusted by the use of a vertically moveable outlet 11, which is provided with a suitable sealing means or packing gland 25. Thus, the height of outlet 11 can be adjusted to any desired level to obtain any desired residence time.

It has been customary in the prior art to dry wet carbon black pellets by passing them through an externally heated rotary dryer. The present invention has the following advantages over such a rotary dryer:

(1) *Economy of space.*—A dryer according to this invention occupies approximately one-tenth of the space occupied by a rotary dryer.

(2) *Reduced initial cost.*—A drying unit of the type shown in this invention costs as little as 15 percent, or less, of the cost of a rotary dryer.

(3) *Increased heat economy.*—Heat transfer rates in a fluidized bed are extremely high, primarily because of the large surface area of the bed of particles. Thus, the effluent drying gas is ordinarily at substantially the same temperature as the fluidized bed at a given point.

(4) *Increased efficiency of control.*—In the prior art, the amount of fuel supplied to the burners of a rotary dryer has been controlled in accordance with the temperature of the dried pellets. In such a separation, there is a substantial time lag caused by low heat transfer rates in a rotary dryer. The present invention facilitates control by regulating the inlet temperature of the drying gas in accordance with the outlet temperature of the used gas. Thus, there is substantially no time lag in the control, according to the present invention.

Although certain process steps, structures, and examples have been described for purposes of illustration, it is clear that the invention is not limited thereto; for example, the present invention is applicable to the drying of catalyst or absorbent pellets, as well as carbon black pellets. Also, wet pellets can be introduced into an intermediate or lower level in the fluidized bed, e. g., in suspension in the drying gas. From the foregoing, it will be evident that the essence of this invention is that wet pellets are dried by introduction into a fluidized pellet bed, passing a drying gas upwardly through said bed, and selectively removing dried pellets from an upper portion of said fluidized bed.

I claim:

1. A process which comprises forming wet pellets of carbon black by a wet pelleting method, introducing said wet pellets into an upper part of a bed of carbon black pellets maintained under hindered settling conditions in an obstructed drying zone by the passage of a hot drying gas upwardly therethrough; heating said drying gas, prior to contacting with said bed, to supply all of the heat required to raise the temperature of said bed above the boiling point of water under the conditions of contacting, whereby water is vaporized and removed from the pellets and dried pellets are caused to move to an upper portion and wet pellets to a lower portion of said bed; and withdrawing dried pellets from a locus, in an upper part of said bed, remote from that at which wet pellets are introduced, said dried pellets being withdrawn at a temperature above the boiling point of water; withdrawing used drying gas from said bed; and cooling and recovering said dried pellets.

2. A process according to claim 1, wherein water is recovered from said used drying gas and recycled for use in said wet pelleting method.

3. A process according to claim 2, wherein carbon black dust is recovered and recycled together with said water.

4. A process for drying wet pellets compacted from particulate solid material comprising introducing said pellets into an unobstructed drying zone countercurrently to a hot drying and fluidizing gas introduced to a lower section of said zone; passing said hot gas thru said zone at a fluidizing velocity to maintain a dense fluidized mass of pellets so as to heat and dry same, said hot gas being the sole means of heating and drying said pellets; gravitating dried pellets from an upper section of the fluidized mass of pellets in said zone; and withdrawing effluent gas from a section of said zone above the pellet introduction and removal levels.

5. A process according to claim 4, wherein said wet pellets contain from 50 to 57 per cent water.

6. A process according to claim 4, wherein said drying gas is introduced into said bed at a temperature in the range 500 to 1000° F. and said dried pellets are withdrawn at a temperature of about 300° F.

7. A process according to claim 4, wherein said wet pellets are introduced into said bed at an upper level therein and at a locus remote from that at which said dried pellets are withdrawn.

References Cited in the file of this patent

UNITED STATES PATENTS

| | | |
|---|---|---|
| 1,402,467 | Zimmerman | Jan. 3, 1922 |
| 2,629,938 | Montgomery | Mar. 3, 1953 |
| 2,649,358 | Palmer | Aug. 18, 1953 |
| 2,663,089 | Coats | Dec. 22, 1953 |
| 2,677,608 | McKay et al. | May 4, 1954 |
| 2,684,931 | Berg | July 27, 1954 |
| 2,709,674 | Bergstrom | May 31, 1955 |
| 2,712,495 | Clarke | July 5, 1955 |
| 2,715,282 | Neven | Aug. 16, 1955 |

OTHER REFERENCES

Industrial and Engineering Chemistry, vol. 41, No. 6, June 1949, Fluid-Solid Air Sizer and Dryer, pages 1247 to 1249, 34–57.

UNITED STATES PATENT OFFICE

CERTIFICATE OF CORRECTION

Patent No. 2,843,942　　　　　　　　　　　　　　　July 22, 1958

Travis S. Whitsel, Jr.

It is hereby certified that error appears in the printed specification of the above numbered patent requiring correction and that the said Letters Patent should read as corrected below.

Column 4, line 52, for "absorbent" read -- adsorbent --; line 65, for "obstructed" read -- unobstructed --.

Signed and sealed this 24th day of February 1959.

(SEAL)
Attest:

KARL H. AXLINE
Attesting Officer

ROBERT C. WATSON
Commissioner of Patents